(12) United States Patent
Johnson et al.

(10) Patent No.: US 7,770,848 B2
(45) Date of Patent: Aug. 10, 2010

(54) CLAMP FOR SECURING AN OBJECT TO A STRUCTURE

(75) Inventors: Richard K. Johnson, Camano Island, WA (US); Jon P. Michel, Clinton, WA (US); Kevin E. Clark, Kirkland, WA (US); Michael L. Gilbertson, Arlington, WA (US)

(73) Assignee: The Boeing Company, Chicago, IL (US)

(*) Notice: Subject to any disclaimer, the term of this patent is extended or adjusted under 35 U.S.C. 154(b) by 0 days.

(21) Appl. No.: 11/947,427

(22) Filed: Nov. 29, 2007

(65) Prior Publication Data
US 2009/0140106 A1 Jun. 4, 2009

(51) Int. Cl.
*F16L 3/08* (2006.01)
(52) U.S. Cl. .................. 248/65; 248/74.1; 248/74.4
(58) Field of Classification Search .......... 248/55, 248/49, 65, 67.7, 74.1, 74.4, 230.1, 230.5, 248/230.4
See application file for complete search history.

(56) References Cited

U.S. PATENT DOCUMENTS

| | | | | |
|---|---|---|---|---|
| 2,355,742 | A * | 8/1944 | Morehouse | 248/68.1 |
| 2,396,925 | A * | 3/1946 | Morehouse | 248/68.1 |
| 2,404,531 | A * | 7/1946 | Robertson | 248/68.1 |
| 2,824,270 | A * | 2/1958 | Anderson | 248/74.4 |
| 3,227,406 | A * | 1/1966 | Shelton et al. | 248/74.4 |
| 3,582,029 | A * | 6/1971 | Moesta | 248/68.1 |
| 4,172,578 | A | 10/1979 | Pate | 248/74 R |
| 4,997,148 | A | 3/1991 | Sherman | 248/74.1 |
| 5,014,940 | A * | 5/1991 | Sherman | 248/74.1 |
| 5,098,047 | A * | 3/1992 | Plumley | 248/68.1 |
| 5,215,281 | A * | 6/1993 | Sherman | 248/74.1 |
| 5,257,768 | A * | 11/1993 | Juenemann et al. | 248/604 |
| 5,261,633 | A | 11/1993 | Mastro | 248/74.1 |
| 6,308,921 | B1 * | 10/2001 | Borzucki | 248/68.1 |
| 6,669,150 | B2 * | 12/2003 | Benoit et al. | 248/74.2 |
| 6,892,990 | B2 * | 5/2005 | Pisczak | 248/74.4 |
| 7,182,301 | B1 * | 2/2007 | Oddsen et al. | 248/122.1 |
| 7,278,190 | B2 * | 10/2007 | Fischer et al. | 24/530 |

OTHER PUBLICATIONS

Quantum Composites Product Data Sheet, Lytex® 9063, Engineered Structural Composite ESC) Molding Compound.
HYDAC Clamps from the HYDAC Accessories Catalog, pp. 73-104.
Boeing Part Standard, Clamp, U-Type, Saddle Crossbar, NB Rubber Cushion, Fuel Resistant, p. 20.26.6.24.1; 5 pages.
Boeing Part Standard, Clamp, U-Type, Saddle Crossbar, PTFE Cushion, p. 20.26.6.26.1; 6 pages.

* cited by examiner

*Primary Examiner*—Anita M King
(74) *Attorney, Agent, or Firm*—Hope Baldauff Hartman LLC (57) ABSTRACT

Apparatus and methods provide an electrically isolating clamp that is suitable for use, among other locations, within a composite wing structure and other fuel environments. According to embodiments described herein, the clamp includes a clamp body and cushion. The clamp body is manufactured from a non-conductive material and includes a strap and a base. The cushion may be manufactured from a different non-conductive material to provide at least two layers of electrical isolation between the tube or other object being secured and a structure. The cushion material allows for axial movement of the tube through the cushion. The cushion is disposed between the strap and the base. Shoulder flanges prevent axial movement of the cushion with respect to the clamp body. The clamp may have a cushion retention mechanism to secure the cushion within the strap prior to installation around the tube.

16 Claims, 8 Drawing Sheets

CLAMP FOR SECURING AN OBJECT TO A STRUCTURE

TECHNICAL FIELD

The present disclosure relates generally to tubing clamps, and more particularly to tubing clamps safe for use within a fuel environment and over a wide range of temperatures.

BACKGROUND

Clamps used to support tubing, ducts, and lines associated with hydraulic, fuel, and other systems have been extensively used in environments in which they are subjected to aircraft fuel or other corrosive and potentially hazardous materials. One example is the use of hydraulic clamps to support the hydraulic tubing within aircraft wings. Aircraft fuel tanks provide unique challenges to common procedures like clamping tubes and cables. The potential for fuel tank ignition is particularly problematic, and as a result, all devices utilized in an aircraft fuel tank must meet stringent federal aviation safety requirements to ensure that metal objects within the fuel tank are properly grounded and/or isolated.

Conventional clamps used within aircraft fuel tanks are made from conductive materials and may utilize rubber cushions between the clamp body and the systems tube or line. During a lightning event, lightning currents will have a tendency to travel on the path of least resistance. The conductive tubing, ducts, or lines of the various aircraft systems provide a path of least resistance. The clamps securing the conductive tubing, ducts, or lines are grounded to metal systems brackets within the aircraft wing to dissipate the induced currents.

Traditionally, large commercial aircraft wings have not been manufactured using composite materials to any substantial extent. However, current technology and other factors are allowing aircraft wing skins to be largely manufactured using composite materials. The use of composite material for the wing skins can result in a less conductive ground path then traditional aluminum wing skins. Composite wing skins can also result in a lower level of electromagnetic shielding versus aluminum-skinned wings, which can lead to larger induced electrical voltages in internal systems components. Additionally, the metal systems brackets traditionally used as ground paths for metal clamps may not exist. Another issue arising from the use of composite wing structures is that the structural flexibility associated with a composite wing may lead to a greater amount of axial hydraulic tube movement than typically exists with tubes in conventional aircraft wings. This increased axial movement is not accommodated by the rubber cushions used with conventional hydraulic clamps.

It is with respect to these considerations and others that the disclosure made herein is presented.

SUMMARY

It should be appreciated that this Summary is provided to introduce a selection of concepts in a simplified form that are further described below in the Detailed Description. This Summary is not intended to be used to limit the scope of the claimed subject matter.

Apparatus and methods described herein provide a clamp for securing an object to a structure. The clamp disclosed herein is ideal for composite structures. Since it is non-metallic, it does not require ground paths to dissipate static electricity and is also used to provide electrical isolation between the systems tube and nearby metallic structure or fasteners. Further, the clamp encloses the tube being secured with one or more different isolating materials, significantly reducing the potential for electrical arcing between the tube and any nearby metallic structure or fasteners caused by electromagnetic effects, electro-static discharge, or other natural phenomena. When used within a composite aircraft wing, the structural features of the clamp body and corresponding cushion allow for increased axial movement of the object being secured, while preventing potentially destructive axial movement of the cushion within the clamp body. Retention features that may be present in the clamp body and the cushion allow for the cushion to be held in place within the strap portion of the clamp body so as to facilitate one-handed installation by the technician when using the clamp in confined spaces.

According to various embodiments, a clamp for securing an object to a structure includes a clamp body and a cushion. The clamp body has a strap and a base that mate together, creating an area between the strap and the base that holds the cushion in place. Front and rear shoulder flanges are configured to retain the cushion in place and limit the cushion from moving axially within the clamp body. These flanges ensure that even if the cushion were to be worn through from friction with the object and/or the clamp body, the cushion would remain retained within the clamp body and would not become debris within the fuel tank or other structure to which it is attached.

According to other embodiments described herein, a method for reducing spark potential associated with a clamp for securing an object to a structure includes replacing any metallic clamps with non-conductive clamps. To install the non-conductive clamps, a cushion is first installed within a strap of the clamp body. The cushion may be made from a different insulating material than that of the clamp body, providing two layers of insulation not subject to common mode failure (i.e. aging, chemical attack, etc) between the object and any fasteners to reduce any potential for electrical arcing. The cushion is then installed around the object and the strap is secured to a base and the structure using fasteners.

According to further embodiments described herein, a clamp assembly for securing an object to a structure includes a strap, a base, and a cushion. The strap and base make up a clamp body, which is manufactured from a non-conductive material to electrically isolate the object. The cushion is manufactured from a different non-conductive material that allows the object to slide axially within the cushion and provides a second layer of electrical isolation for the object. The strap has two legs and a bridge that spans between the legs, creating a cushion retaining recess in an underside of the strap. This recess has a rim around it that faces the front side of the clamp body and another rim around it that faces the rear side of the clamp body. The cushion has front and rear shoulder flanges that are spaced apart to overlay the front and rear facing rims in the cushion retaining recess of the strap to prevent axial movement of the cushion. The base of the clamp body has two ends that mate with the strap legs on the top side of the base and mate with the structure on an underside of the base.

The features, functions, and advantages that have been discussed can be achieved independently in various embodiments of the present invention or may be combined in yet other embodiments, further details of which can be seen with reference to the following description and drawings.

DETAILED DESCRIPTION

The following detailed description is directed to apparatus and methods for providing a non-conductive clamp for securing an object to a structure. As discussed briefly above, conventional clamps used within fuel-filled aircraft wings to secure hydraulic tubes are metallic and grounded to metal structures within the wing. However, composite wing structures may not contain the desired grounding surfaces and may also create increased axial movement of hydraulic tubes that are not accommodated by the structure of existing tubing clamps. Accordingly, embodiments of the disclosure presented below provide for a non-conductive clamp that not only allows for axial movement of a tube secured by the clamp, but also provides one or more layers of varying electrically isolating materials between the tube and any fasteners or other potentially conductive aircraft structure.

Figure 1:
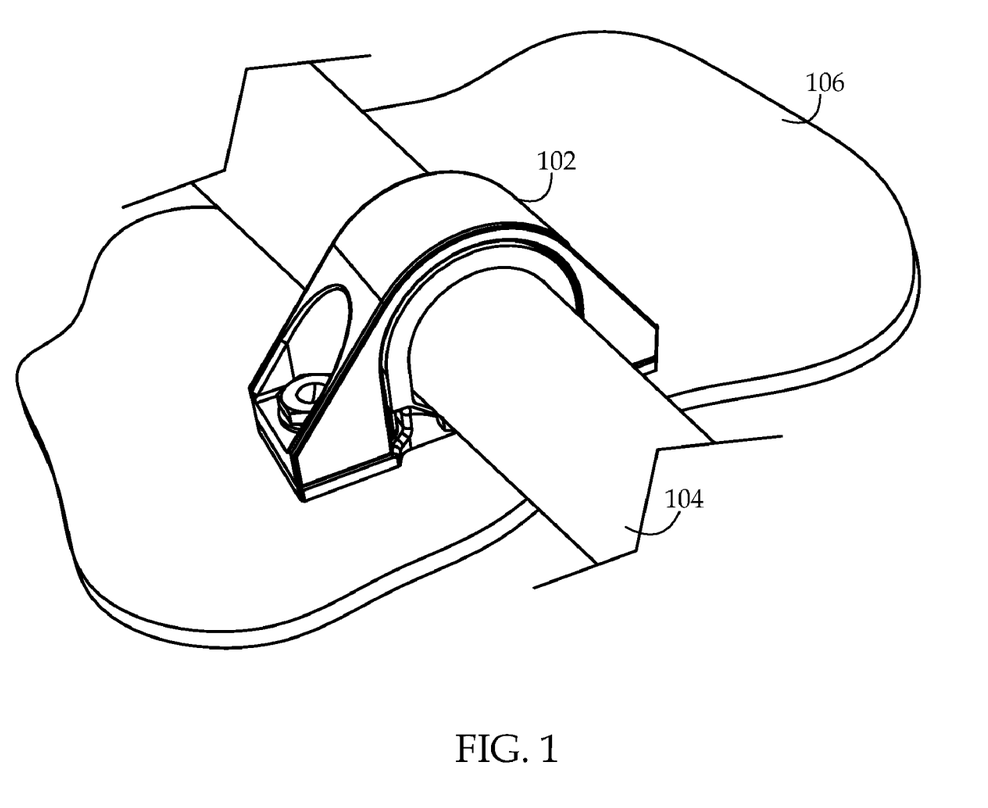
FIG. 1 is a perspective view of an installed clamp according to various embodiments presented herein.

In the following detailed description, references are made to the accompanying drawings that form a part hereof, and which are shown by way of illustration, specific embodiments, or examples. Referring now to the drawings, in which like numerals represent like elements through the several figures, aspects of a non-conductive clamp will be described. FIG. 1 shows a tubing clamp 102 mounted to a structure 106. According to various embodiments, the structure 106 is a bracket or other structural attachment in an aircraft wing or other fuel tank. Throughout this disclosure, the tubing clamp 102 may be described in the context of being installed within an aircraft wing that will be filled with fuel. However, it should be appreciated that the embodiments described herein are equally applicable in any fuel tank environment. Additionally, while the various embodiments described below provide a tubing clamp 102 that is ideal for a fuel environment, the embodiments are equally relevant to an environment containing any type of liquid, or even to a dry environment. Moreover, it should be appreciated that while the clamp described in the various embodiments below is described as a "tubing clamp," the clamp may be utilized to secure any object to any structure without departing from the scope of this disclosure.

Figure 2:
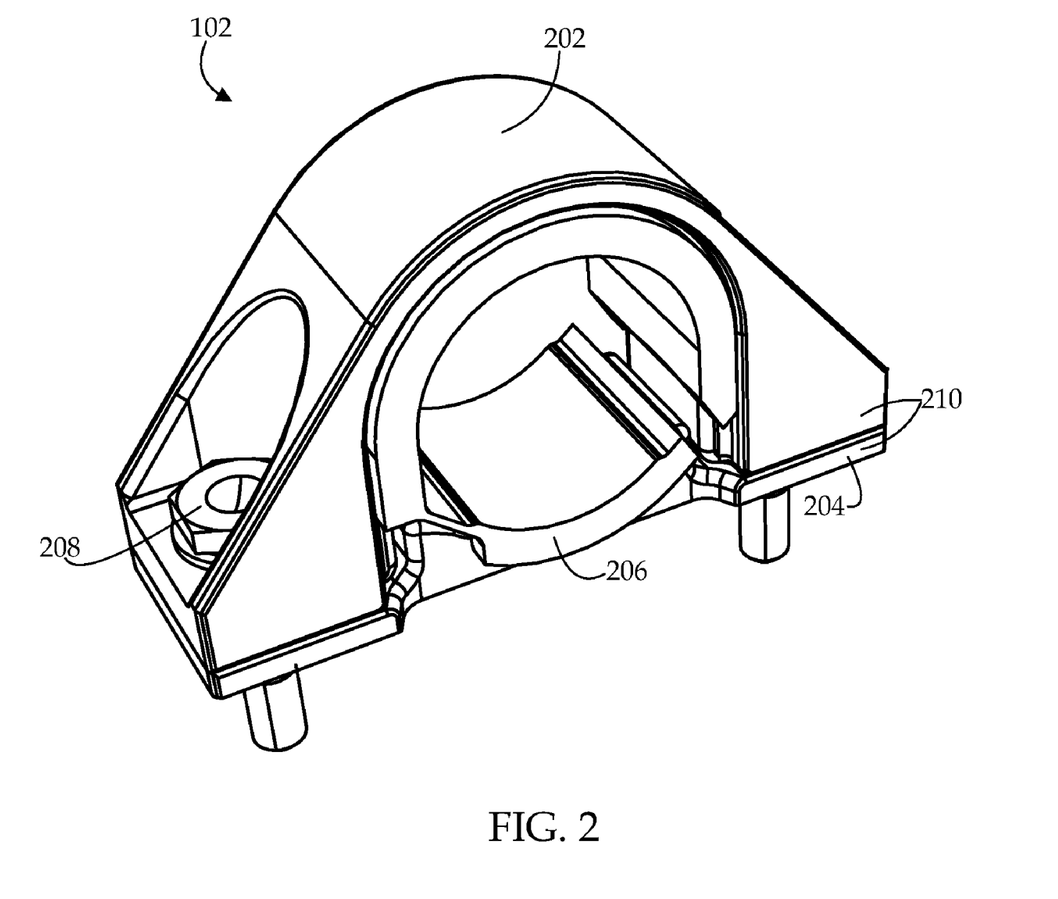
FIG. 2 is a left perspective view of an assembled clamp according to various embodiments presented herein.
Figure 3:
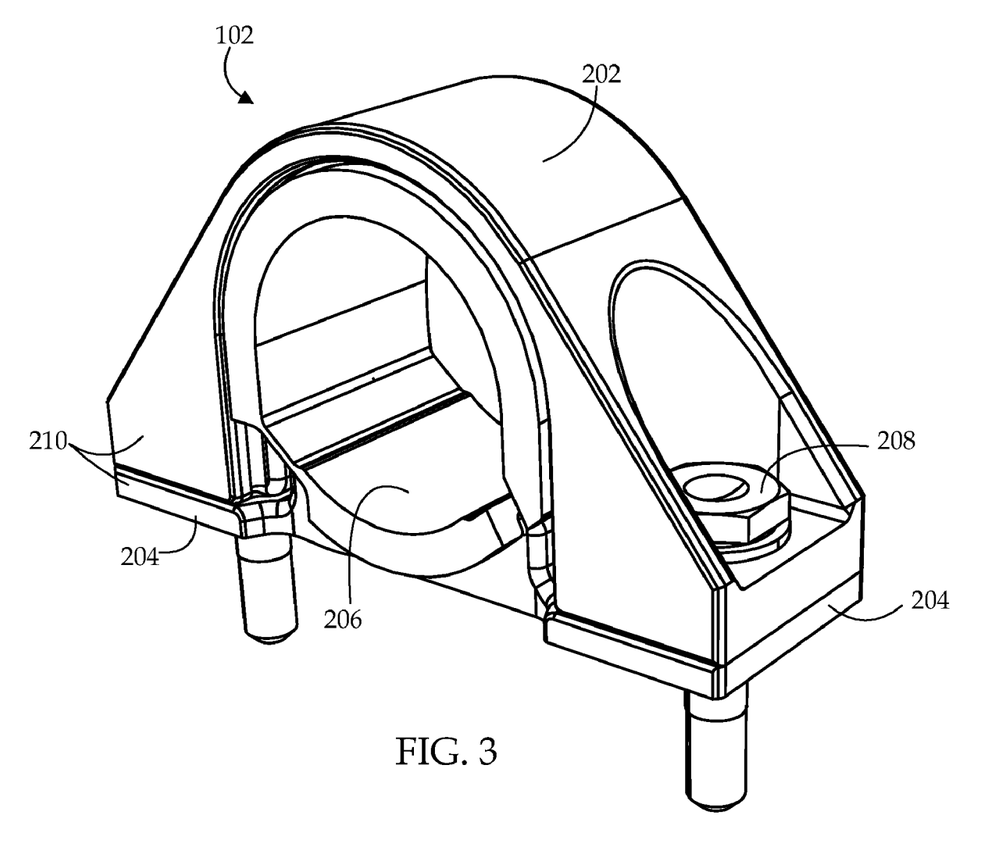
FIG. 3 is a right perspective view of an assembled clamp according to various embodiments presented herein.
Figure 4:
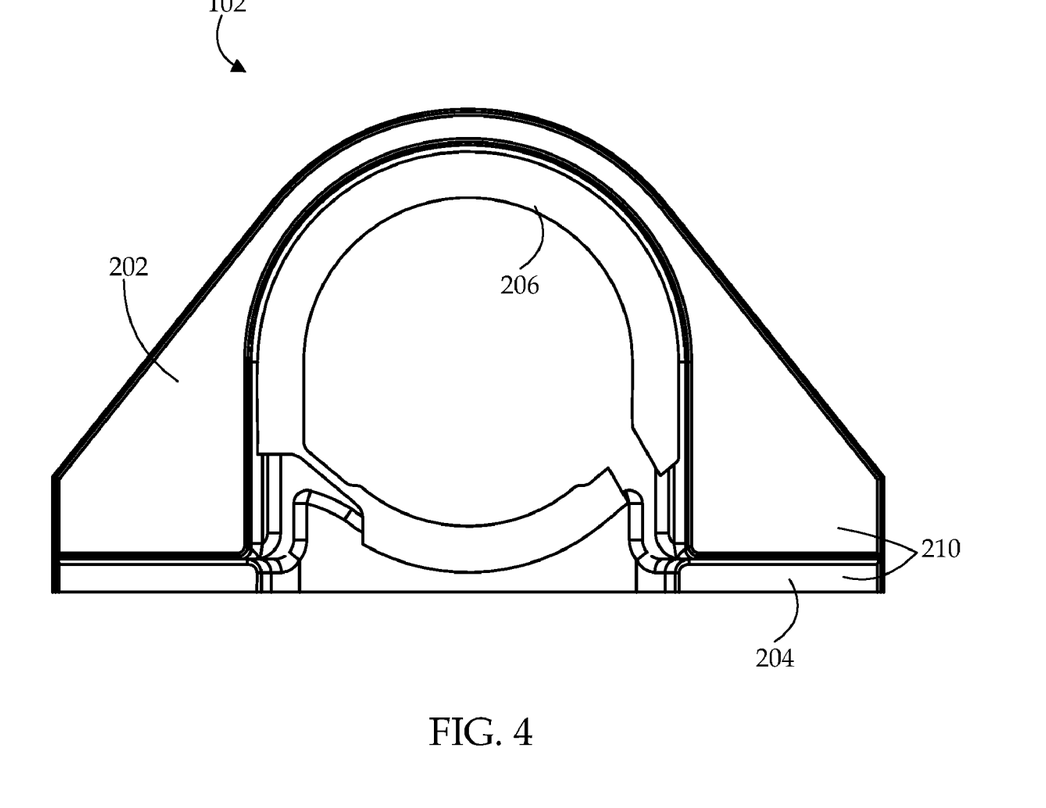
FIG. 4 is a front elevation view of an assembled clamp according to various embodiments presented herein.

Returning to FIG. 1, the tubing clamp 102 secures the tube 104 to the structure 106, while allowing the tube 104 to move axially through the tubing clamp 102. The tube 104 may be a hydraulic tube or any other type of tube to be secured to the structure 106. FIGS. 2-4 show the tubing clamp 102 in an assembled configuration, however without the tube 104 for clarity purposes. According to various embodiments, the tubing clamp 102 includes a cushion 206 and a clamp body 210, which is made up of a strap 202 and a base 204. The cushion 206 surrounds the tube 104 and is sandwiched between the strap 202 and the base 204 when the tubing clamp 102 is mounted to the structure 106. The tubing clamp 102 is secured to the structure 106 with fasteners 208.

Although the various FIGURES show a tubing clamp 102 that includes a clamp body 210 and a cushion 206, it should be understood that the tubing clamp 102 may be used without the cushion 206 according to an alternative embodiment. In this embodiment, the clamp body 210 is manufactured from a single electrically isolating material with wear and friction characteristics that allow for axial movement of the tube 104, while providing the desired electrical isolation properties. The tubing clamp 102 of this alternative embodiment includes the strap 202 and the base 204 as shown in the various FIGURES, which operate to secure and electrically isolate the tube 104 without the use of the cushion 206. According to various embodiments, the tubing clamp 102 is configured to provide a physical separation, or gap, between the tube 104 and the structure 106 that is sufficient to prevent electrical arcing between the tube 104 and the structure 106 in the event of an electromagnetic effect such as a lightning event. The distance of the physical separation is dictated by the minimum bulk resistivity of the medium filling the gap (fuel, air, water, etc) and the specific electro-magnetically induced voltage level that must be accommodated.

In addition to arcing over the gap between the tube 104 and the structure 106, another concern in electrically isolating the tube 104 from the structure 106 and any other potentially conductive element such as the fasteners 208 includes preventing electrical surface flashover, which is characterized by a voltage discharge over the surface of the electrically isolating material separating the tube 104 and the structure 106 or fasteners 208. Accordingly, various embodiments described herein provide a surface path on the tubing clamp 102 with dimensions that are dictated by the bulk and surface resistivities of the clamp material(s) and the specific electro-magnetically induced voltage level that must be accommodated. It should be appreciated that the gap width and the surface path may be determined according to the specific application of the tubing clamp 102 using known engineering principals.

According to one embodiment, the tubing clamp 102 is configured to provide a minimum 0.75 inch electrically isolative surface path to prevent surface flashover and a minimum 0.25 inch physical separation to prevent electrical arcing. According to additional embodiments, the tubing clamp 102 could be configured to provide between approximately 0.3 inch to 3.5 inches isolative surface path and approximately 0.1 inch to 3.5 inch physical separation between the tube 104 and the structure 106 to provide protection against lower or higher anticipated voltages. It should be appreciated that the tubing clamp 102 may be configured with longer or shorter isolative surface path and physical separation dimensions to provide protection against higher or lower voltages within any conceivable range likely to be encountered in an aerospace or other application.

Figure 5:
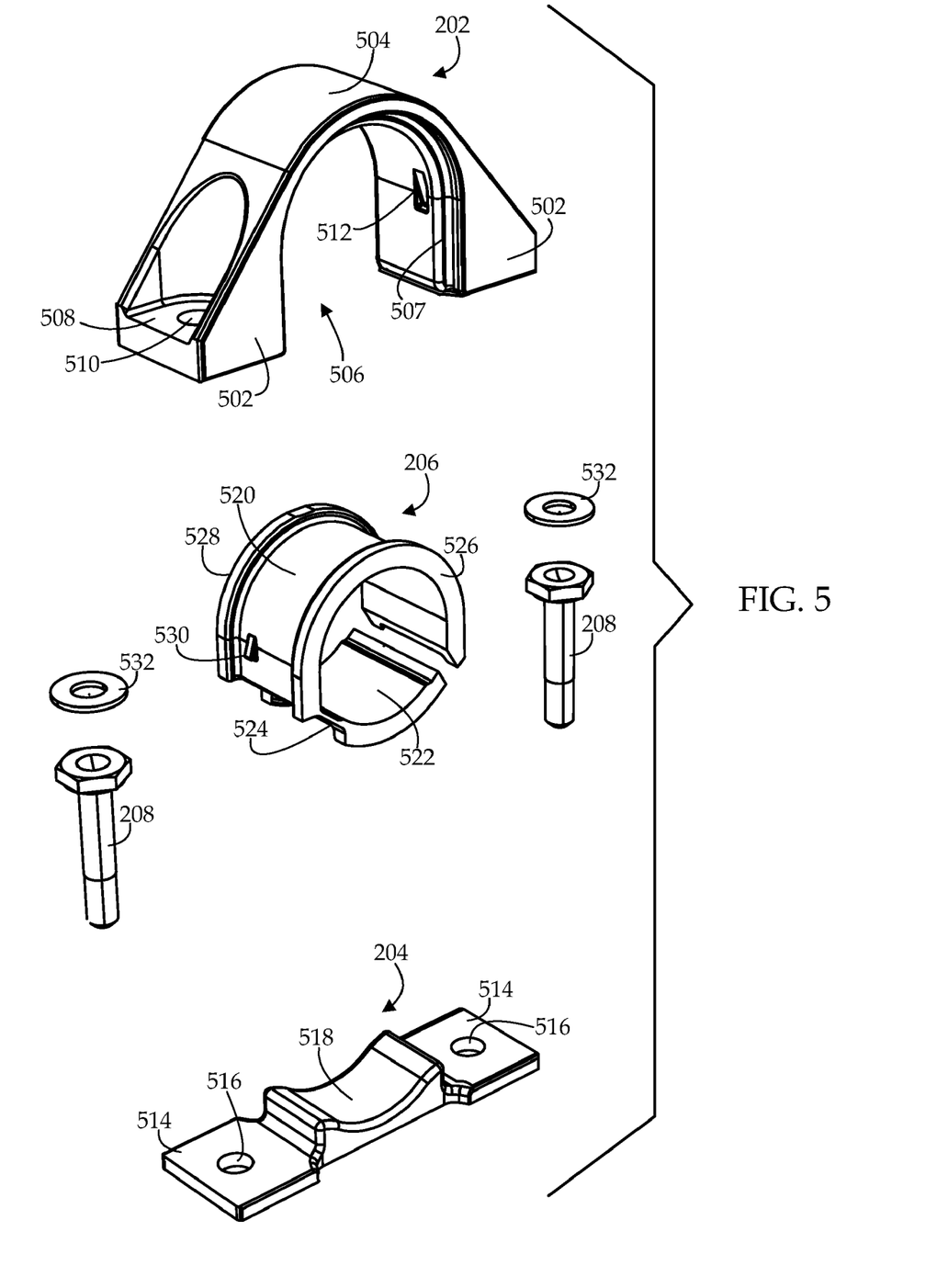
FIG. 5 is an exploded view of a clamp as seen from a left perspective according to various embodiments presented herein.
Figure 6:
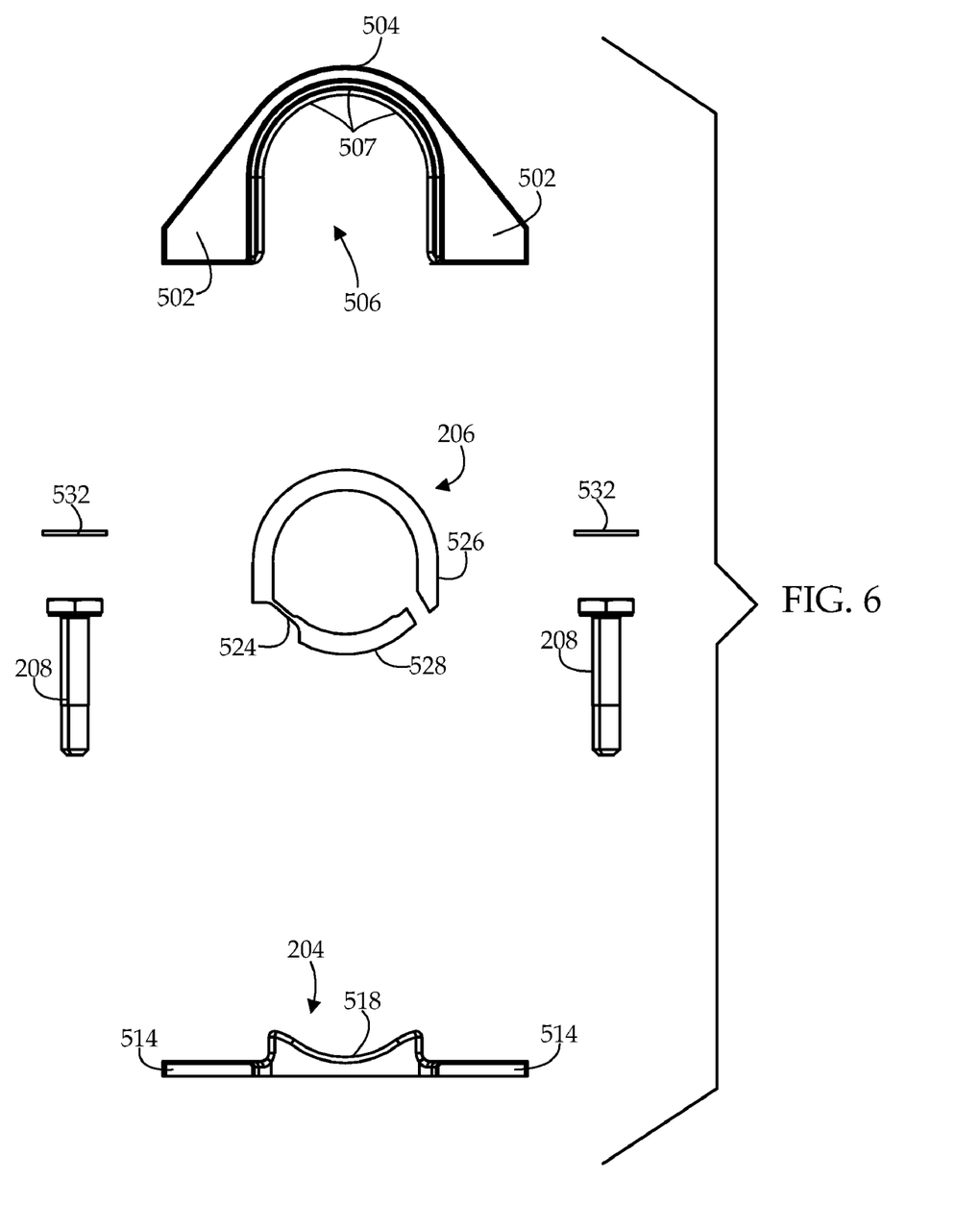
FIG. 6 is an exploded view of a clamp as seen from the front according to various embodiments presented herein.
Figure 7:
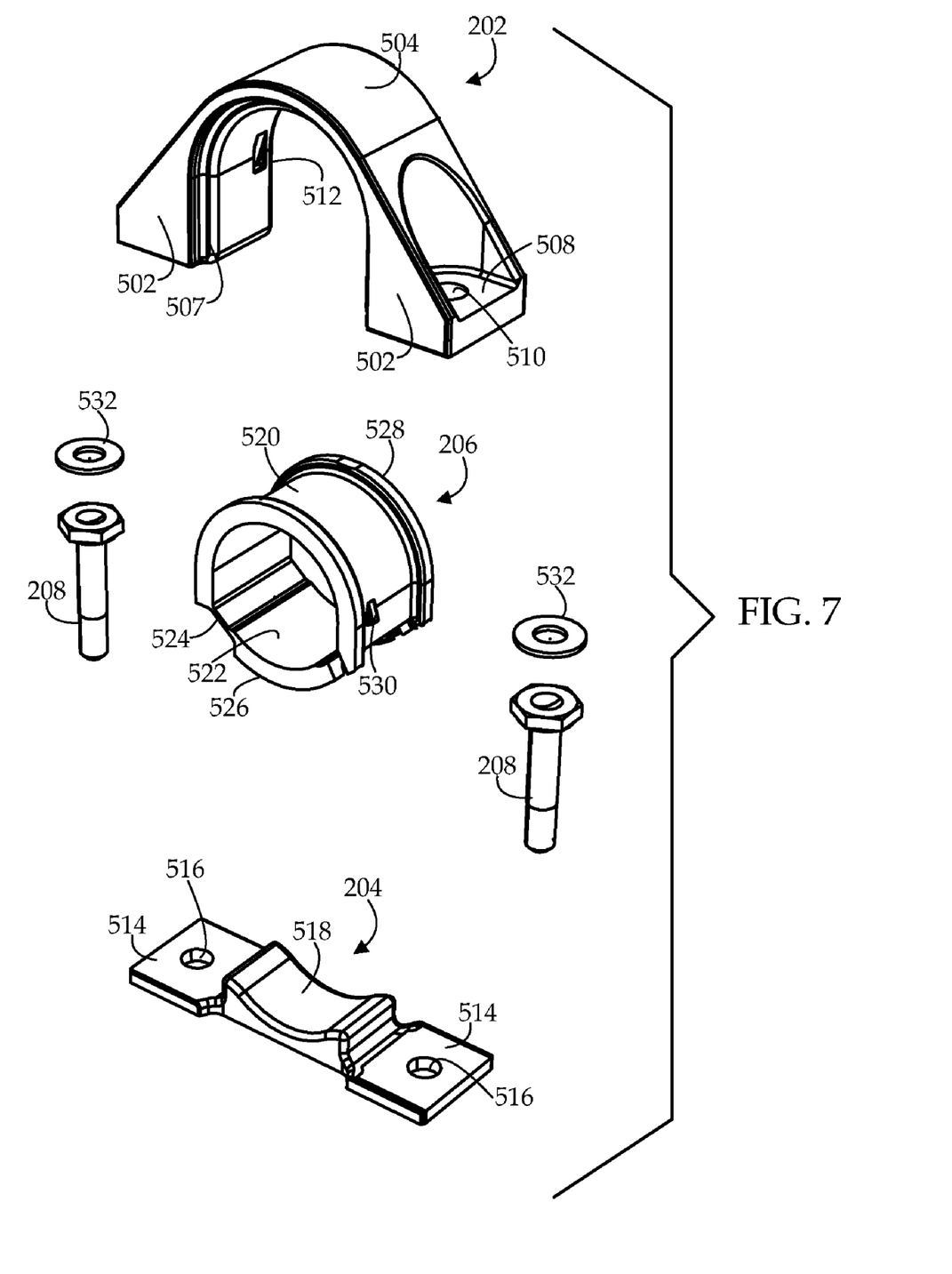
FIG. 7 is an exploded view of a clamp as seen from a right perspective according to various embodiments presented herein.

FIGS. 5-7 show various exploded views of the tubing clamp 102. The components of the tubing clamp 102 will now be described in detail with reference to these illustrations. The strap 202 includes two strap legs 502 that are connected via a bridge 504. The strap legs 502 and the bridge 504 may be manufactured as a single piece that defines a cushion retaining recess 506. As will be described in detail below, the cushion retaining recess 506 includes front and rear cushion engagement rims 507 (rear cushion engagement rim not shown) that are configured to support the cushion 206 and to prevent the cushion 206 from moving axially with respect to the clamp body 210. Also to be discussed further below, the cushion retaining recess 506 includes cushion retention slots 512 for securing the cushion 206 within the cushion retaining recess 506 prior to installing the strap 202 onto the base 204.

The strap 202 further includes strap flanges 508 as part of each strap leg 502. An underside of each strap flange 508 abuts a corresponding base flange 514 on the base 204. The strap flanges 508 and base flanges 514 include corresponding strap apertures 510 and base apertures 516, which align to guide the fasteners 208 into position to secure the tubing clamp 102 to the structure 106. It should be understood that while the strap 202 is shown in FIGS. 5-7 to be generally arched-shaped with recesses created over the strap flanges 508 to accommodate a tool for engaging the fasteners 208, any shape and configuration of the strap 202 may be utilized without departing from the scope of this disclosure. For example, a generally rectangular block shape may be utilized for the strap 202, with the cushion retaining recess 506 projecting inward from the bottom surface of the strap 202 and strap apertures 510 extending to the top surface of the rectangular strap 202.

The thickness, width and length of the strap 202 and corresponding strap flanges 508, as well as the distance from the strap apertures 510 to the tube 104, are calculated to minimize arcing potential between the tube 104 and the fasteners 208 or the structure 106. Furthermore, the exterior geometry of the strap 202 may be shaped to increase the isolative surface path to help resist voltage flashover. This geometry may vary according to various factors including the isolating materials used to manufacture the clamp body 210 and the cushion 206, as well as the anticipated voltage levels that must be accommodated due to electromagnetic effects, electro-static discharge, or other natural phenomena. The specific geometry for each specific application may be determined through known engineering techniques without requiring undue experimentation.

The base 204 includes base flanges 514 and corresponding base apertures 516. The thickness and width of the base flanges 514 and corresponding base apertures 516, as well as the distance from the base apertures 516 to the tube 104, are calculated to minimize arcing potential between the tube 104 and the fasteners 208 or the structure 106. Furthermore, the exterior geometry of the base 204 may be shaped to increase the isolative surface path to help resist voltage flashover. This geometry may vary according to various factors including the isolating materials used to manufacture the clamp body 210 and the cushion 206, as well as the anticipated voltage levels that must be accommodated due to electromagnetic effects, electro-static discharge, or other natural phenomena. The specific geometry for each specific application may be determined through known engineering techniques without requiring undue experimentation.

In addition to the base flanges 514, the base 204 includes an arcuate cushion support 518. The cushion support 518 provides a surface that abuts the cushion 206. According to one implementation, the arc radius of the cushion support 518 is approximately the same as the arc radius of the outer surface of the cushion 206 to which the cushion support 518 abuts. The depth of the cushion support 518, or the distance from the front edge of the cushion support 518 to the rear edge of the cushion support 518, is generally equivalent to or slightly less than the depth of the cushion 206 between shoulder flanges 526 and 528 to secure the cushion 206 against axial movement as described below.

The cushion 206 is generally circular in cross-section to allow the inner surface of the cushion 206 to encircle and abut the tube 104. However, it is contemplated that the cushion retaining recess 506 and corresponding cushion 206 may include a rectangular shape or any other shape, so long as the tubing clamp 102 is configured to secure the cushion 206 within the cushion retaining access and to secure the tube at a location on the structure 106. The cushion 206 includes an upper cushion segment 520, a lower cushion segment 522, and a hinge mechanism 524 joining the upper cushion segment 520 and the lower cushion segment 522 together. By hinging the two segments of the cushion 206, a technician is able to open the cushion 206, install it on the tube 104, and then close the cushion 206 so that it substantially or completely encompasses the tube 104.

Moreover, by hinging the cushion 206 rather than requiring the upper cushion segment 520 to be mechanically attached to the lower cushion segment 522 once the tube 104 is in place, the technician can perform the installation process with one hand, a feature that allows the tubing clamp 102 to be installed in confined spaces that would ordinarily be extremely difficult if not impossible to do with two hands. The hinge 524 is shown to be a living hinge, or one created from a known process that thins the cushion 206 material between the upper cushion segment 520 and the lower cushion segment 522, allowing the two rigid segments to rotate around the pliable hinge 524. It should be appreciated that the hinge 524 may alternatively be any type of known hinge meeting the federal aviation requirements for operation in a fuel environment.

According to one embodiment, the cushion 206 includes a front integral shoulder flange 526 and a rear integral shoulder flange 528. These flanges are positioned around the circumference of the front edge of the cushion 206 and around the circumference of the rear edge of the cushion 206, respectively. The front integral shoulder flange 526 and the rear integral shoulder flange 528 are manufactured as an integral part of the one-piece cushion 206. They project radially outward from an outer surface of the cushion 206 and are sized to overlay the front and rear cushion engagement rims 507 of the strap 202. These integral shoulder flanges 526 and 528 function to limit or prevent any axial movement of the cushion 206 with respect to the clamp body 210 when the tubing clamp 102 is installed. According to an alternative embodiment, the integral shoulder flanges 526 and 528 are manufactured as an integral part of the strap 202 and the base 204. In this alternative embodiment, the front and rear edges of the cushion 206 would abut an inside surface of flanges 526 and 528 when the cushion 206 is installed within the clamp body 210.

Looking back at FIGS. 1-4, the front integral shoulder flange 526 can be seen to overlay the front edge of the cushion support 518. It should be appreciated that the front and rear cushion engagement rims 507 may be positioned a distance inward from the front and rear surfaces of the strap 202, respectively, to allow the outward surfaces of the corresponding front integral shoulder flange 526 and rear integral shoulder flange 528 to be generally flush with the front and rear surfaces of the strap 202 when the cushion 206 is installed within the cushion retaining recess 506. Alternatively, the strap 202 may not include the front and rear cushion engagement rims 507. Instead, according to this alternative embodiment, the cushion 206 is sized such that the front integral shoulder flange 526 and the rear integral shoulder flange 528 overlay the front and rear surfaces, respectively, of the strap 202.

In addition to preventing axial movement of the cushion 206 with respect to the clamp body 210, the front integral shoulder flange 526 and the rear integral shoulder flange 528 prevent the cushion 206 from leaving the tubing clamp 102, even if worn through by excessive wear and tear. For example, if the cushion 206 is worn through into two separate pieces at a location within the upper cushion segment 520, or at the hinge 524, then each separate piece would still be prevented from exiting the clamp body 210 and falling into the fuel tank because of the front integral shoulder flange 526 and the rear integral shoulder flange 528. Consequently, this feature prevents potential damage caused from foreign objects within the fuel system in the event of a failure of the cushion 206.

As discussed briefly above, embodiments of the disclosure presented herein allow a technician to install the tubing clamp 102 with one hand, facilitating the installation process when working in confined spaces. To further assist the one-handed installation process, various embodiments provide a cushion retention mechanism that includes the cushion retention slots 512 in the cushion retaining recess 506 and corresponding cushion retention tabs 530 positioned on the upper cushion segment 520. The cushion retention slots 512 are recessed areas that are sized to receive the cushion retention tabs 530 projecting outward from the outer surface of the cushion 206. To install the cushion 206 into the strap 202, the cushion is pushed upward until the cushion retention tabs 530 snap into the cushion retention slots 512. Doing so allows the strap 202 and attached cushion to be installed over the tube 104 with one hand.

Looking at FIGS. 5 and 7, it can be seen that the cushion retaining recess 506 includes two offset cushion retention slots 512 corresponding to the two offset cushion retention tabs 530 on the cushion 206. However, it should be appreciated that any number of cushion retention slots 512 and cushion retention tabs 530 may be used at any location without departing from the scope of this disclosure. Moreover, any other mechanical or chemical cushion retention mechanisms may be used to secure the cushion 206 within the strap 202 prior to mating the strap 202 to the base 204. Alternative retention methods may include, but are not limited to, adhesive bonding, overmolding, thermal welding, pins, rivets, and threaded fasteners.

The fasteners 208 used may be any typical fastener satisfactory for use in a fuel environment. The fasteners may or may not require the use of a nut on the rear side of the structure 106. Alternatively, the fasteners 208 may be screwed into threaded apertures in the structure 106 or may be self-deforming so as to prevent the fastener 208 from returning once driven into an aperture in the structure 106. Additionally, one or more washers or spacers 532 may be used with the fasteners 208, as required. The fasteners 208 may be manufactured from metal or other non-metallic materials.

As stated above, embodiments described herein may be configured to provide for at least two electrically isolating materials within the tubing clamp 102 that provide at least two layers of isolation between the tube 104 and the fasteners 208 or any other metal of the structure 106. According to one embodiment, the clamp body 210 is a compression molded thermo set LYTEX 9063 and the cushion 206 is an injection molded thermoplastic PFA 350 TEFLON. However, it should be understood that the clamp body 210 may include any other specific thermo set product, other thermoplastic, or any other isolating material satisfying the federal aviation regulations for submersed use within a fuel environment. Similarly, the cushion 206 may be any other thermoplastic product or other non-conductive product that allows for minimal wear while submersed in a fuel environment in spite of the sustained friction between the cushion 206 and the tube 104 that is created by the axial movement of the tube 104 within the cushion 206.

The clamp body 210 and the cushion 206 may be manufactured from any known process, including but not limited to, compression molding, injection molding, and composite lay-up techniques. Moreover, the clamp body 210 and the cushion 206 should be capable of operating in temperatures generally between −60 F and 225 F with brief excursions to 275 F. It should be appreciated that the tubing clamp 102 may be manufactured to accommodate any size tube 104. According to various embodiments, the tubing clamp 102 is manufactured to accommodate multiple sizes of tubes 104 between ¼ inch and 4 inches in diameter.

Figure 8:
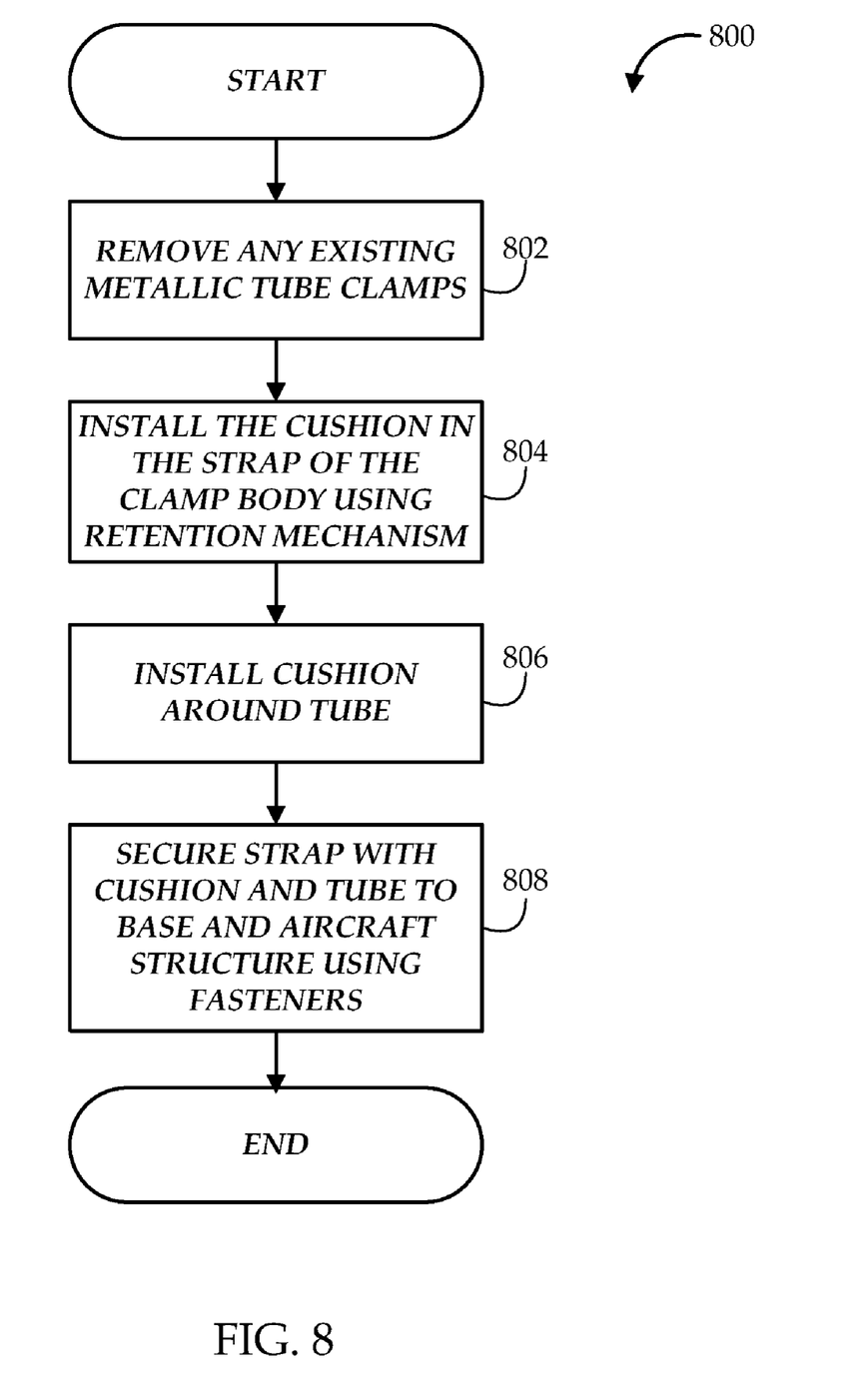
FIG. 8 is a flow diagram illustrating a method for reducing spark potential associated with a clamp used to secure an object to a structure according to various embodiments presented herein.

Turning now to FIG. 8, an illustrative routine 800 for reducing spark potential associated with a tubing clamp within a fuel tank will now be described in detail. The routine 800 will be described with respect to the tubing clamp 102 shown in FIGS. 1-7 in the context of replacing existing metal tubing clamps with tubing clamps 102 described in the various embodiments above or installing tubing clamps 102 in an aircraft where none previously existed. The routine 800 begins at operation 802, where a technician removes any existing metallic tubing clamps.

At operation 804, the technician installs the cushion 206 within the cushion retaining recess 506 of the strap 202. As described above, this may be accomplished by pressing the upper cushion segment 520 into the cushion retaining recess 506 of the strap 202 until the cushion retention tabs 530 on the cushion 206 snap into the corresponding cushion retention slots 512 of the strap 202. It should be appreciated that this operation may be accomplished by the manufacturer or other entity prior to receipt by the technician. From operation 804, the routine 800 continues to operation 806, where the technician installs the cushion 206 around the tube 104. To do so, the technician opens the cushion 206 by rotating the lower cushion segment 522 outward and then lowers the strap 202 and attached cushion 206 onto the tube 104 so that the tube 104 is seated within the cushion 206. At operation 808, the technician secures the strap 202 with the installed cushion 206 and the captured tube 104 to the base 204 and the structure 106 using the fasteners 208 and the routine 800 ends. It should be appreciated that securing the tubing clamp 102 to the structure may entail modification of the existing hole pattern in the structure 106, particularly if replacing existing clamps with the tubing clamps 102 disclosed herein.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A clamp for securing an object to a structure, comprising:
   a clamp body configured for attachment to the structure, the clamp body comprising a strap and a base, wherein the strap and the base are configured to mate together and define a cushion retaining recess, and wherein the strap comprises two strap flanges, each with a strap aperture, and the base comprises two base flanges, each with a base aperture aligned with a strap aperture when the base is mated to the strap;
   a cushion sized to surround the object and abut an inner surface of the cushion retaining recess, the cushion comprising a rigid upper cushion segment, a rigid lower cushion segment, and a hinge mechanism connecting the rigid upper cushion segment and the rigid lower cushion segment and operative to allow the rigid lower cushion segment to rotate around the hinge mechanism when the rigid upper cushion segment is stationary;
   a front shoulder flange; and a rear shoulder flange, wherein the front shoulder flange and the rear shoulder flange are configured to limit axial movement of the cushion with respect to the clamp body.

2. The clamp of claim 1, wherein the base comprises an arcuate cushion support configured to engage the rigid lower cushion segment of the cushion.

3. The clamp of claim 1, wherein the cushion retaining recess comprises a front cushion engagement rim and a rear cushion engagement rim, wherein the front shoulder flange is positioned around a circumference of a front edge of the cushion and configured to overlay the front cushion engagement rim, and wherein the rear shoulder flange is positioned around a circumference of a rear edge of the cushion and configured to overlay the rear cushion engagement rim.

4. The clamp of claim 1, further comprising a cushion retention mechanism operative to secure the cushion within the strap when the strap is not mated to the base.

5. The clamp of claim 4, wherein the cushion retention mechanism comprises a plurality of cushion retention tabs on the rigid upper cushion segment positioned to engage a plurality of cushion retention slots within the cushion retaining recess to secure the cushion to the strap.

6. The clamp of claim 1, wherein the clamp body is manufactured from a first non-conductive material, wherein the cushion is manufactured from a second non-conductive material that is not identical to the first non-conductive material such that the clamp provides two layers of electrically isolating material around the object.

7. The clamp of claim 6, wherein the first non-conductive material comprises a thermo set and the second non-conductive material comprises a thermoplastic.

8. The clamp of claim 7, wherein the thermo set comprises a compression molded thermo set material.

9. The clamp of claim 8, wherein the thermoplastic comprises an injection molded thermoplastic material.

10. A method for reducing spark potential associated with a clamp for securing a tube to a fuel tank, comprising:
removing a metallic clamp from a location inside the fuel tank;
installing a cushion within a strap component of a clamp body such that the cushion is secured within the strap component, the clamp body comprising a first electrically isolating material and the cushion comprising a second electrically isolating material;
after installing the cushion within the strap component of the clamp body, sliding the strap component and cushion over the tube such that the tube enters an upper cushion segment of the cushion and rotating a lower cushion segment of the cushion around a hinge between the upper cushion segment and the lower cushion segment until the lower cushion segment abuts the tube; and
securing the strap component of the clamp body to the fuel tank via a base component of the clamp body with a fastener at the location inside the fuel tank where the metallic clamp was removed, wherein the base component of the clamp body is positioned between the strap component of the clamp body and the fuel tank such that the first electrically isolating material and the second electrically isolating material are disposed between the tube and the fuel tank and between the tube and the fastener.

11. The method of claim 10, wherein securing the strap component of the clamp body to the fuel tank via the base component of the clamp body with the fastener comprises:
positioning the base component in place against the fuel tank;
positioning the strap component with the cushion and tube against the base component such that a strap aperture of the strap component aligns with a corresponding base aperture of the base component; and
installing the fastener through the strap aperture, through the base aperture, and into the fuel tank.

12. A clamp assembly for securing an object to a structure, comprising:
a clamp body manufactured from a first non-conductive material that provides a first insulating material between the object and a fastener used to secure the clamp body to the structure, the clamp body comprising
a strap comprising two strap legs and a bridge spanning the two strap legs to create a cushion retaining recess in an underside of the strap, the cushion retaining recess comprising a front cushion engagement rim and a rear cushion engagement rim, and
a base comprising an arcuate cushion support and two ends, the two ends configured to mate with the two strap legs of the strap on a top side of the base and configured to mate with the structure on an underside of the base;
a cushion manufactured from a second non-conductive material that allows axial movement of the object within the cushion and provides a second electrically isolating material between the object and the fastener, wherein the cushion is sized to surround the object and abut an inner surface of the cushion retaining recess and comprises
a front integral shoulder flange positioned around a circumference of a front edge of the cushion and configured to overlay the front cushion engagement rim, a rear integral shoulder flange positioned around a circumference of a rear edge of the cushion and configured to overlay the rear cushion engagement rim such that the front integral shoulder flange and the rear integral shoulder flange limit axial movement of the cushion with respect to the clamp body,
an upper cushion segment,
a lower cushion segment, and
a hinge mechanism connecting the upper cushion segment and the lower cushion segment and operative to allow the lower cushion segment to rotate around the hinge mechanism when the upper cushion segment is stationary,
wherein the arcuate cushion support of the base is configured to engage the lower cushion segment of the cushion between the front integral shoulder flange and the rear integral shoulder flange; and
a cushion retention mechanism operative to secure the cushion within the strap when the strap is not mated to the base.

13. A method for reducing spark potential associated with a clamp for securing an object to a structure, comprising:
aligning a cushion with a cushion retaining recess of a strap component of a clamp body such that a front integral shoulder flange of the cushion overlays a front cushion engagement rim of the strap component and a rear integral shoulder flange of the cushion overlays a rear cushion engagement rim of the strap component;
pressing the cushion into the cushion retaining recess of the strap component until a plurality of cushion retention tabs disposed on an outer surface of the cushion engages a plurality of cushion retention slots on an inner surface of the cushion retaining recess to secure the cushion to the strap component;
installing the cushion around the object; and securing the strap component of the clamp body to the structure via a base component of the clamp body with a fastener, wherein the base component of the clamp body is positioned between the strap component of the clamp body and the structure such that a first electrically isolating material of the clamp body and a second electrically isolating material of the cushion are disposed between the object and the structure and between the object and the fastener.

14. A method for reducing spark potential associated with a clamp for securing an object to a structure, comprising:

aligning a cushion with a cushion retaining recess of a strap component of a clamp body such that a front integral shoulder flange of the cushion overlays a front cushion engagement rim of the strap component and a rear integral shoulder flange of the cushion overlays a rear cushion engagement rim of the strap component;

pressing the cushion into the cushion retaining recess of the strap component until a cushion retention mechanism engages to secure the cushion to the strap component such that the cushion is secured within the strap component, wherein the clamp body comprises a first electrically isolating material and the cushion comprises a second electrically isolating material;

after installing the cushion within the strap component of the clamp body, sliding the strap component and cushion over the object such that the object enters an upper cushion segment of the cushion and rotating a lower cushion segment of the cushion around a hinge between the upper cushion segment and the lower cushion segment until the lower cushion segment abuts the object; and securing the strap component of the clamp body to the structure via a base component of the clamp body with a fastener, wherein the base component of the clamp body is positioned between the strap component of the clamp body and the structure such that the first electrically isolating material and the second electrically isolating material are disposed between the object and the structure and between the object and the fastener.

15. The method of claim 14, wherein the cushion retention mechanism comprises a plurality of cushion retention tabs disposed on an outer surface of the cushion and positioned to engage a plurality of cushion retention slots on an inner surface of the cushion retaining aperture of the strap component of the clamp body.

16. The method of claim 14, wherein securing the strap component of the clamp body to the structure via the base component of the clamp body with the fastener comprises:

positioning the base component in place against the structure;

positioning the strap component with the cushion and object against the base component such that a strap aperture of the strap component aligns with a corresponding base aperture of the base component; and installing the fastener through the strap aperture, through the base aperture, and into the structure.

\* \* \* \* \*